United States Patent
Kobayashi

(10) Patent No.: US 6,823,757 B2
(45) Date of Patent: Nov. 30, 2004

(54) ELECTROMAGNETIC SOLENOID AND SHIFT ACTUATOR FOR A TRANSMISSION USING THE SAME

(75) Inventor: Kazuhiko Kobayashi, Kanagawa (JP)

(73) Assignees: Isuzu Motors Limited, Tokyo (JP); Transtron Inc., Kawasaki (JP)

(*) Notice: Subject to any disclaimer, the term of this patent is extended or adjusted under 35 U.S.C. 154(b) by 0 days.

(21) Appl. No.: 10/677,356

(22) Filed: Oct. 3, 2003

(65) Prior Publication Data

US 2004/0100345 A1 May 27, 2004

(30) Foreign Application Priority Data

Oct. 4, 2002 (JP) ........................................ 2002-292739

(51) Int. Cl.$^7$ .............................................. B60K 17/12
(52) U.S. Cl. ..................... 74/473.12; 335/266; 335/267
(58) Field of Search ............................... 335/266–267, 335/296–299; 74/473.1, 473.12

(56) References Cited

U.S. PATENT DOCUMENTS

| | | | | |
|---|---|---|---|---|
| 5,166,652 A | * | 11/1992 | Koyama et al. | ............. 335/234 |
| 5,460,060 A | * | 10/1995 | Nellums | .................. 74/473.12 |
| 5,802,915 A | * | 9/1998 | Organek et al. | ............... 74/331 |
| 6,732,607 B2 | * | 5/2004 | Yamamoto et al. | ....... 74/473.12 |
| 6,739,211 B2 | * | 5/2004 | Yamamoto et al. | ............ 74/335 |
| 2003/0000328 A1 | * | 1/2003 | Hayashi et al. | ........... 74/473.12 |

FOREIGN PATENT DOCUMENTS

| | | | | |
|---|---|---|---|---|
| EP | 1225374 A2 | * | 7/2002 | ........... F16H/61/32 |
| JP | 2002243034 A | * | 8/2002 | ........... F16H/61/28 |
| JP | 2002243035 A | * | 8/2002 | ........... F16H/61/32 |
| JP | 2003136993 A | * | 5/2003 | ........... B60K/20/02 |
| JP | 2003139241 A | * | 5/2003 | ........... F16H/61/28 |

* cited by examiner

*Primary Examiner*—Lincoln Donovan
*Assistant Examiner*—Bernard Rojas
(74) *Attorney, Agent, or Firm*—James N. Dreser, Esq.

(57) ABSTRACT

An electromagnetic solenoid comprising a cylindrical body yoke, a front yoke arranged on one end side of the body yoke, a fixed yoke formed integrally with the front yoke, a back yoke arranged on the other end side of the body yoke, a center yoke arranged at the central portion of the body yoke, a first electromagnetic coil arranged along the inner peripheral surface of the body yoke between the center yoke and the front yoke, a second electromagnetic coil arranged along the inner peripheral surface of the body yoke between the center yoke and the back yoke, an operation rod arranged being inserted through the front yoke and the fixed yoke so as to move, a first moving yoke mounted on an end of the operation rod on the side of the back yoke, a second moving yoke arranged on the operation rod so as to slide between the first moving yoke and the fixed yoke, and a limiting means for limiting the second moving yoke from moving toward the back yoke at an intermediate position in a range in which the first moving yoke moves.

1 Claim, 9 Drawing Sheets (a)

(b)

ELECTROMAGNETIC SOLENOID AND SHIFT ACTUATOR FOR A TRANSMISSION USING THE SAME

FIELD OF THE INVENTION

The present invention relates to an electromagnetic solenoid and to a shift actuator for a transmission using the electromagnetic solenoid for actuating, in a direction of shift, a shift lever to operate a gear-changing mechanism of the transmission mounted on a vehicle.

DESCRIPTION OF THE RELATED ART

As a shift actuator for a transmission for actuating, in the direction of shift, a shift lever to operate the gear-changing mechanism of the transmission, there has generally been used a fluid pressure cylinder using, as a source of operation, a pneumatic pressure or a fluid pressure such as hydraulic pressure or the like. The shift actuator using the hydraulic cylinder requires a piping for connection to the source of fluid pressure, an electromagnetic change-over valve for changing over the flow passage of the operation fluid, and requires space for their arrangement. These requirements are accompanied by a problem of an increase in the weight of the apparatus as a whole.

In recent years, further, there has been proposed an actuator driven by an electric motor as a shift actuator for a transmission mounted on a vehicle that is equipped with neither a source of the compressed air nor a source of hydraulic pressure. Unlike the actuator that uses a fluid pressure cylinder, the shift actuator constituted by an electric motor requires none of the piping for connection to the source of fluid pressure or the electromagnetic change-over valve. Therefore, the device as a whole can be constituted in a compact size and in a light weight. However, the actuator driven by the electric motor requires a reduction mechanism for obtaining a predetermined operation force. As reduction mechanisms, there have been proposed the one that uses a ball-screw mechanism and the one that uses a gear mechanism. The actuators using the ball-screw mechanism and the gear mechanism, however, are not necessarily satisfactory in regard to durability of the ball-screw mechanism and the gear mechanism, in regard to durability of the electric motor and in regard to the operation speed.

Meanwhile, JP-A 2002-213606 discloses a shift actuator for a transmission that uses an electromagnetic solenoid, as an actuator that has excellent durability and a high operation speed.

It is necessary that the shift actuator for a transmission must come to a halt at a neutral position of the gear-changing mechanism. Due to its structure, however, the electromagnetic solenoid is actuated to a position where the electromagnetic coil is excited and to a position where the electromagnetic coil is not excited, but comes, with a great difficulty, to a halt at the intermediate position. To halt the electromagnetic solenoid at the intermediate position, a position detection means and a complex control device including feedback control are necessary. Therefore, if the electromagnetic solenoid can be brought to a halt at the intermediate position without using the position detection means and the complex control device, its application to a variety of equipment can be expected.

SUMMARY OF THE INVENTION

It is a first object of the present invention to provide an electromagnetic solenoid that can be brought to a halt at the intermediate position without using a position detector means and a complex control device. It is a second object of the present invention to provide a shift actuator for a transmission using an electromagnetic solenoid that can be brought to a halt at the neutral position of the gear-changing mechanism without using a position detector means and a complex control device.

In order to achieve the above first object, the present invention provides an electromagnetic solenoid comprising a cylindrical body yoke, a front yoke arranged on one end side of the body yoke, a fixed yoke that is formed integrally with the front yoke and is arranged in the body yoke, a back yoke arranged on the other end side of the body yoke, an annular center yoke arranged at the central portion of the body yoke in the axial direction thereof, a first annular electromagnetic coil that is arranged along the inner peripheral surface of the body yoke between the center yoke and the front yoke so as to surround the fixed yoke, a second annular electromagnetic coil arranged along the inner peripheral surface of the body yoke between the center yoke and the back yoke, an operation rod arranged being inserted through the front yoke and the fixed yoke so as to move in the axial direction, a first moving yoke mounted on an end of the operation rod on the side of the back yoke, a second moving yoke arranged on the operation rod so as to slide between the first moving yoke and the fixed yoke, and a limiting means for limiting the second moving yoke from moving toward the back yoke at an intermediate position in a range in which the first moving yoke moves.

It is desired that a magnetism shut-off ring made of a non-magnetic material is provided in the central portion of the body yoke in the axial direction thereof. Further, the limiting means comprises a stopper portion which protrudes inward in the radial direction on the inner peripheral surface of the center yoke.

In order to achieve the above second object, further, the present invention provides a shift actuator of a transmission equipped with a first electromagnetic solenoid and a second electromagnetic solenoid for actuating, in the directions opposite to each other, an operation member coupled to a shift lever for operating a gear-changing mechanism of the transmission, wherein said first electromagnetic solenoid and said second electromagnetic solenoid comprise, respectively, a cylindrical body yoke, a front yoke arranged on one end side of the body yoke, a fixed yoke that is formed integrally with the front yoke and arranged in the body yoke, a back yoke arranged on the other end side of the body yoke, an annular center yoke arranged at the central portion of the body yoke in the axial direction thereof, a first annular electromagnetic coil that is arranged along the inner peripheral surface of the body yoke between the center yoke and the front yoke so as to surround the fixed yoke, a second annular electromagnetic coil arranged along the inner peripheral surface of the body yoke between the center yoke and the back yoke, an operation rod that is arranged being inserted through the front yoke and the fixed yoke so as to move in the axial direction and is coupled to the operation member, a first moving yoke mounted on an end of the operation rod on the side of the back yoke, a second moving yoke arranged on the operation rod so as to slide between the first moving yoke and the fixed yoke, and a limiting means for limiting the second moving yoke from moving toward the back yoke at an intermediate position in a range in which the first moving yoke moves.

DETAILED DESCRIPTION OF THE PREFERRED EMBODIMENTS

Preferred embodiments of an electromagnetic solenoid and a shift actuator for a transmission using the electromagnetic solenoid, constituted according to the present invention will now be described in further detail with reference to the accompanying drawings.

Figure 1:
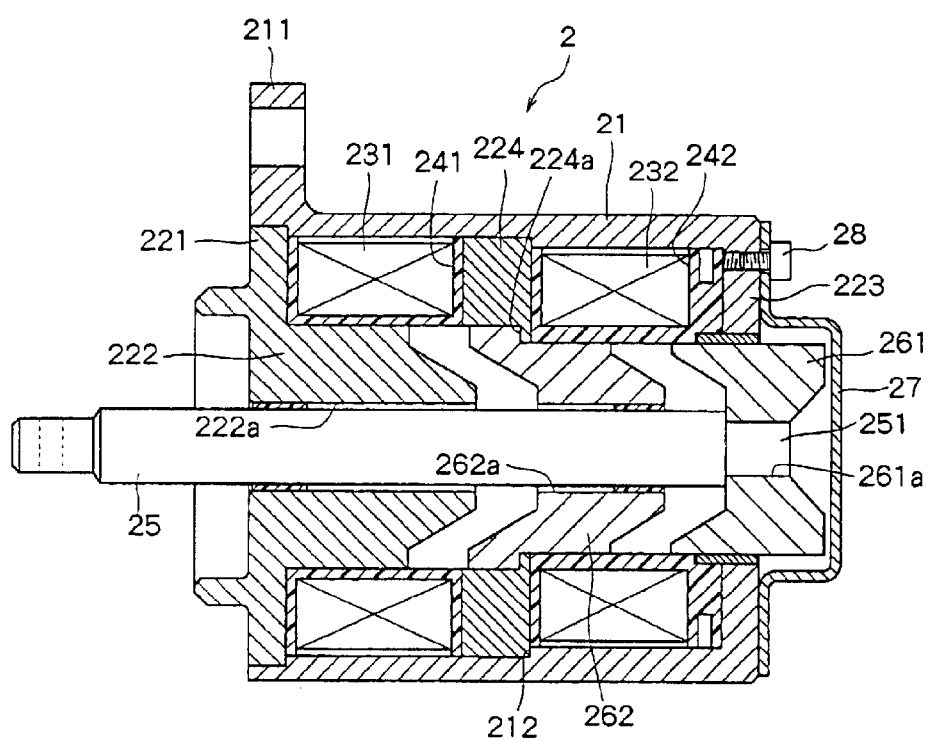
FIG. 1 is a sectional view illustrating an electromagnetic solenoid constituted according to an embodiment of the present invention.

FIG. 1 is a sectional view illustrating an electromagnetic solenoid constituted according to an embodiment of the present invention. The electromagnetic solenoid 2 shown in FIG. 1 has a cylindrical body yoke 21. The body yoke 21 is made of a magnetic material in a cylindrical shape and has a mounting flange 211 formed on an outer periphery thereof at one end (left end in FIG. 1). In the body yoke 21, there are arranged a front yoke 221 and a fixed yoke 222 on one end side thereof, a back yoke 223 on the other end side thereof (at the right end in FIG. 1), and further a center yoke 224 at the central portion in the axial direction thereof.

The front yoke 221 and the fixed yoke 222 are formed of a magnetic material integrally together, the fixed yoke 222 protruding from the right side surface in the drawing of the front yoke 221 at the central portion. In the front yoke 221 and in the fixed yoke 222, an insertion-hole 222a is formed penetrating through the center portions thereof in the axial direction. In the thus constituted front yoke 221 and the fixed yoke 222, the fixed yoke 222 is inserted from one end side of the body yoke 21, and the front yoke 221 is mounted on one end portion of the body yoke 21. The back yoke 223 is formed of a magnetic material in an annular shape, and is mounted on the other end portion of the body yoke 21 (right end in FIG. 1). The center yoke 224 is formed of a magnetic material in an annular shape, and is fitted in along the inner peripheral surface of the body yoke 21. The center yoke 224 is positioned as its right surface in FIG. 1 of the outer peripheral portion thereof comes in contact with a stepped portion 212 formed on the inner peripheral surface at the center in the axial direction of the body yoke 21. The center yoke 224 has an annular stopper portion 224a that is formed at the right end in FIG. 1 of the inner peripheral surface thereof and protrudes inward in the radial direction.

The electromagnetic solenoid 2 of the illustrated embodiment is provided with a first annular electromagnetic coil 231 and a second annular electromagnetic coil 232 arranged along the inner peripheral surface of the body yoke 21. The first electromagnetic coil 231 is wound on an annular bobbin 241 made of a non-magnetic material such as a synthetic resin or the like, and is so arranged between the center yoke 224 and the front yoke 221 as to surround the fixed yoke 222. The second electromagnetic coil 232 is wound on an annular bobbin 242 made of a non-magnetic material such as a synthetic resin or the like, and is arranged between the center yoke 224 and the back yoke 223. The inner diameter of the bobbin 242 on which the second electromagnetic coil 232 is wound is smaller than the inner diameter of the bobbin 241 on which the first electromagnetic coil 231 is wound, and, in the illustrated embodiment, is equal to the inner diameter of the stopper portion 224a formed on the center yoke 224.

The electromagnetic solenoid 2 of the illustrated embodiment has an operation rod 25 that is arranged to be inserted in the insertion-hole 222a formed in the front yoke 221 and in the fixed yoke 222 and is allowed to move in the axial direction. The operation rod 25 is formed of a non-magnetic material such as a stainless steel or the like, and is so arranged as to protrude at its left end toward the left in FIG. 1 beyond the front yoke 221 mounted on the body yoke 21. On the operation rod 25 are arranged a first moving yoke 261 and a second moving yoke 262. The first moving yoke 261 is formed of a magnetic material and has a fitting hole 261a formed in the central portion thereof. The fitting hole 261a is fitted to a small-diameter portion 251 formed at an end of the operation rod 25 on the side of the back yoke 223 (right end in FIG. 1), and is secured to the operation rod 25 by a suitable fixing means. The second moving yoke 262 is formed of a magnetic material and has an insertion-hole 222a. The second moving yoke 262 is arranged between the first moving yoke 261 and the fixed yoke 222, and has its insertion-hole 222a fitted into the intermediate portion of the operation rod 25 so as to slide in the axial direction. The second moving yoke 262 is so constituted to have a right end surface in FIG. 1 formed on the outer peripheral portion thereof that it comes in contact with the stopper portion 224a formed on the center yoke 224. This stopper portion 224a is provided at a position at which the second moving yoke 262 comes into contact therewith, the position being the intermediate portion in a range in which the first moving yoke 261 moves. Therefore, the stopper portion 224a works as a limiting means for limiting the second moving yoke 262 from moving toward the back yoke 223 at the intermediate position in a range in which the first moving yoke 261 moves. Here, the limiting means may be such that the second moving yoke 262 comes in contact with the bobbin 242 on which the second electromagnetic coil 232 is wound and that the bobbin 242 works as a stopper, instead of forming the stopper portion 224a on the center yoke 224.

In FIG. 1, reference numeral 27 denotes a cover member for covering the first moving yoke 261 to prevent water, dust and dirt from entering into the electromagnetic solenoid. The cover member 27 is secured to the back yoke 223 by using screws 28.

The electromagnetic solenoid 2 of the embodiment illustrated in FIG. 1 is constituted as described above. Next, the operation will be described with reference to FIG. 2.

When an electric current is supplied to the second electromagnetic coil 232 in a state of a return position shown in FIG. 1, a magnetic field generates around the second electromagnetic coil 232 and a magnetic circuit (magnetic flux) is formed as shown by an arrow 232a in FIG. 2(a). As a result, the first moving yoke 261 and the second moving yoke 262 attract each other. At this moment, the second moving yoke 262 comes in contact with the stopper portion 224a formed on the center yoke 224 and is limited from moving toward the right in FIG. 2(a). Therefore, the first moving yoke 261 moves toward the left in FIG. 2(a). And, the first moving yoke 261 comes to a halt at a position where it has come in contact with the second moving yoke 262 as shown in FIG. 2(a). Accordingly, the operation rod 25 mounting the second moving yoke 262 is brought to the intermediate position shown in FIG. 2(a). When an electric current is supplied to the second electromagnetic coil 232, a magnetic circuit (magnetic flux) is formed around the second electromagnetic coil 232 as shown by an arrow 232a in FIG. 2(a) and, at the same time, a parasitic flux shown by an arrow 232b generates. However, the parasitic flux shown by the arrow 232b is weaker than the magnetic flux shown by the arrow 232a and hence, affects extremely little.

Next, when an electric current is supplied to the first electromagnetic coil 231 in the state of FIG. 2(a), a magnetic field generates around the first electromagnetic coil 231 and a magnetic circuit (magnetic flux) is formed as shown by an arrow 231a in FIG. 2(b). When the electric current is supplied to the first electromagnetic coil 231, a parasitic flux generates, too, as shown by an arrow 231b in FIG. 2(b). As a result, the first moving yoke 261 and the second moving yoke 262 are attracted by the fixed yoke 222 as shown in FIG. 2(b). Therefore, the operation rod 25 mounting the second moving yoke 262 is brought to a full stroke position shown in FIG. 2(b) in the operation range. When actuated to the full stroke position as shown in FIG. 2(b), the electric current is supplied not only to the first electromagnetic coil 231 but also to the second electromagnetic coil 232 to maintain a state where the first moving yoke 261 and the second moving yoke 262 are closely contacted to each other. In this case, too, the electric current needs not be supplied by 100% but may be supplied by an amount that is enough for maintaining the closely contacted state.

Figure 2:
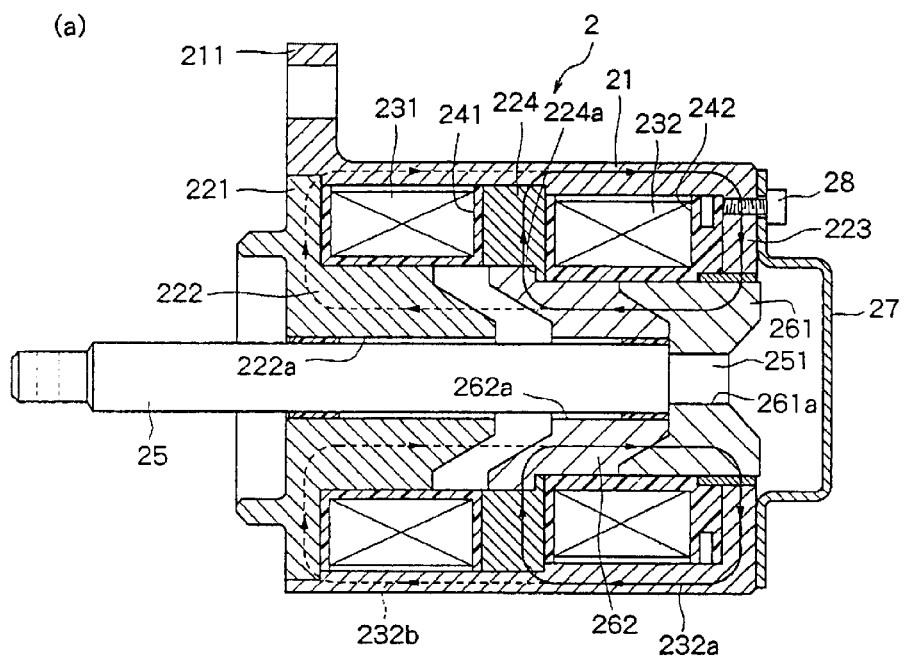
FIG. 2 is a view illustrating an operating state of the electromagnetic solenoid shown in FIG. 1.
Figure 2:
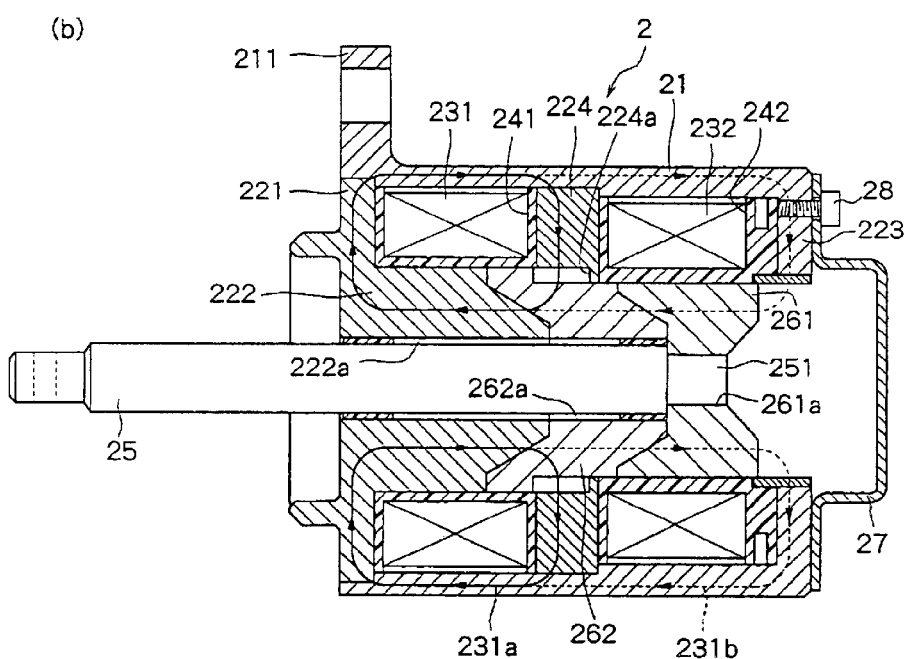
Figure 3:
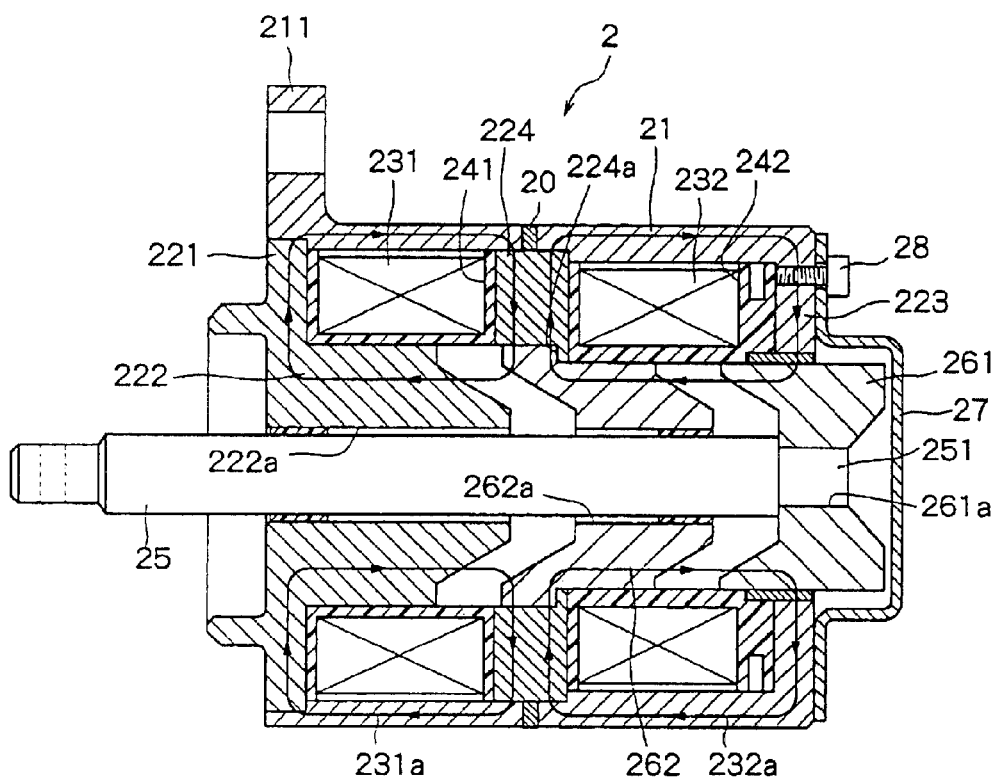
FIG. 3 is a sectional view illustrating the electromagnetic solenoid constituted according to another embodiment of the present invention.

Next, described below with reference to FIG. 3 is the electromagnetic solenoid constituted according to another embodiment of the present invention. In the embodiment shown in FIG. 3, the members which are the same as those members of the embodiment shown in FIGS. 1 and 2 are denoted by the same reference numerals but their description is not repeated.

The electromagnetic solenoid 2 of the embodiment shown in FIG. 3 has a magnetism shut-off ring 20 that is made of a non-magnetic material such as a stainless steel or the like and is disposed at the central portion of the body yoke 21 in the axial direction, i.e., at a position facing the center yoke 224 in order to prevent the occurrence of parasitic flux (shown by an arrow 232b in FIG. 2(a)) that generates at the time when an electric current is supplied into the second electromagnetic coil 232 in the embodiment shown in FIGS. 1 and 2. Due to this constitution, a magnetic circuit (magnetic flux) is formed as shown by an arrow 232a in FIG. 3 when an electric current is supplied to the second electromagnetic coil 232, and a magnetic circuit (magnetic flux) is formed as shown by an arrow 231a in FIG. 3 when an electric current is supplied to the first electromagnetic coil 231.

Next, described below with reference to FIGS. 4 to 9 is a shift actuator for a transmission using the electromagnetic solenoid constituted according to the present invention.

Figure 4:
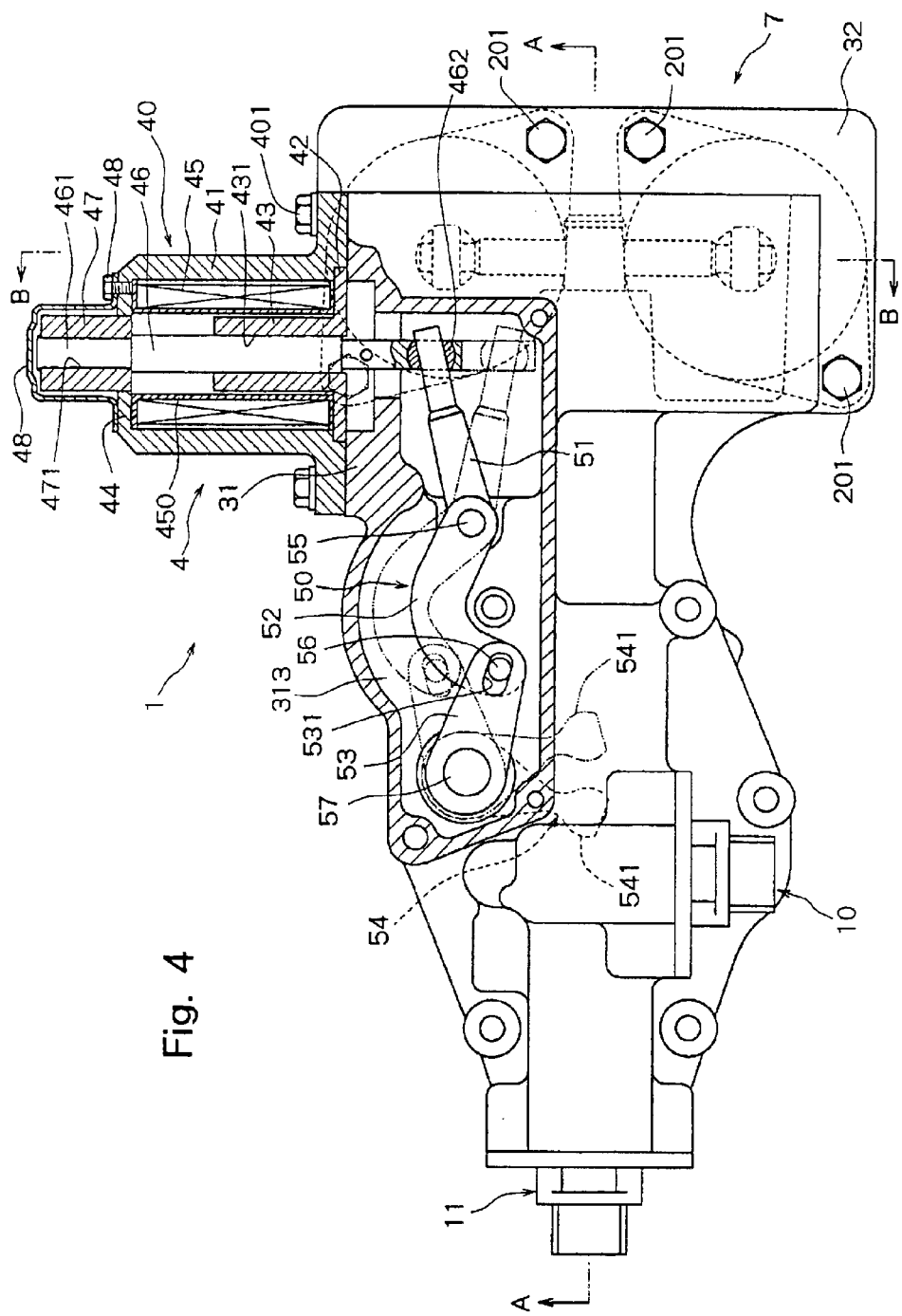
FIG. 4 is a plan view illustrating, partly in a cut-away manner, a gear change device equipped with a shift actuator constituted according to the present invention.
Figure 5:
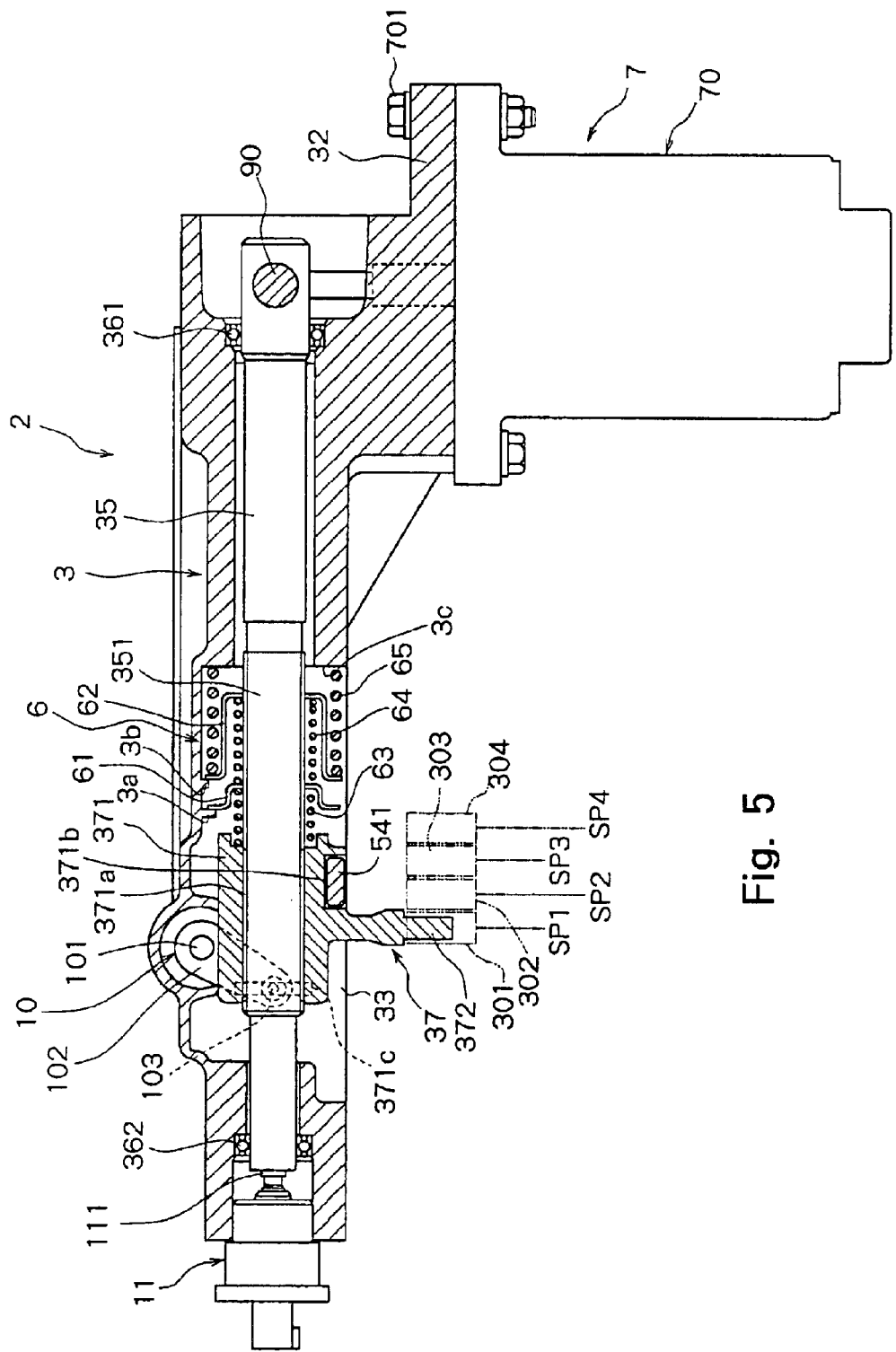
FIG. 5 is a sectional view along the line A—A in FIG. 4.
Figure 6:
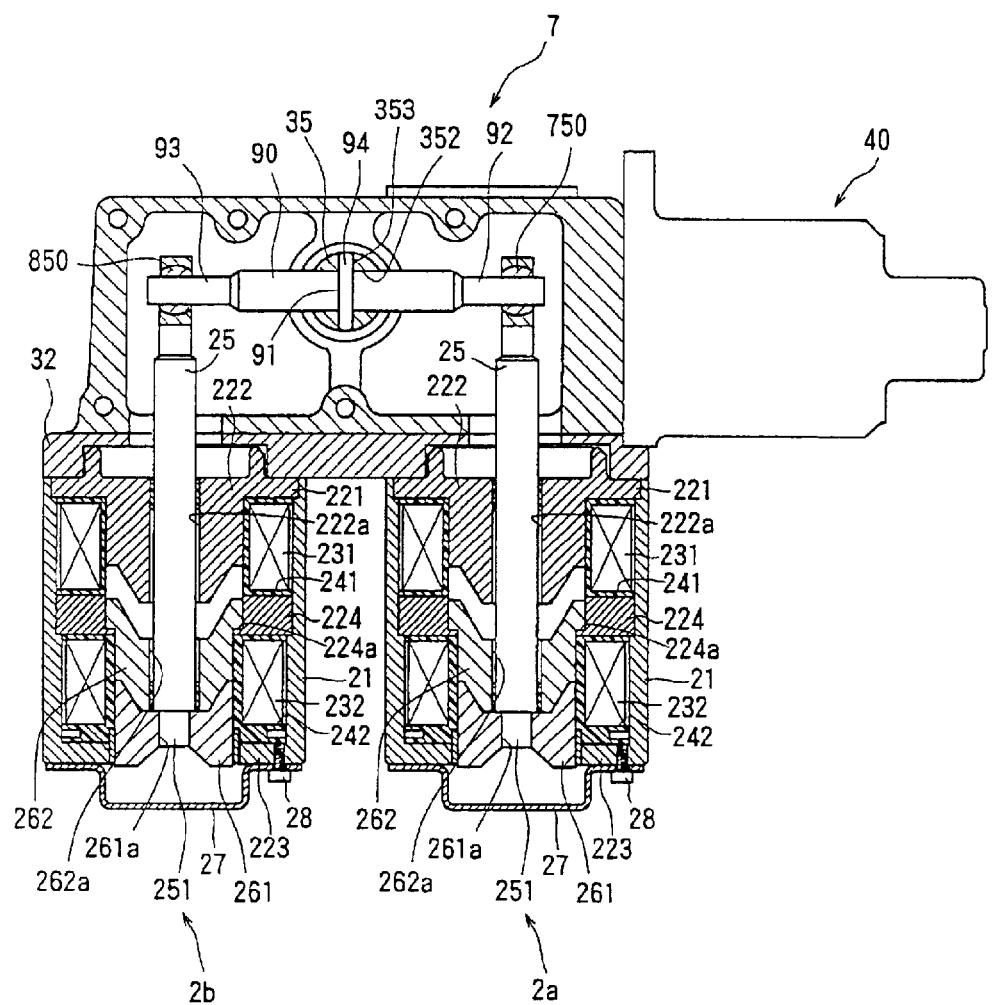
FIG. 6 is a sectional view along the line B—B in FIG. 4.

FIG. 4 is a plan view illustrating, partly in a cut-away manner, a gear change device equipped with a shift actuator constituted according to the present invention, FIG. 5 is a sectional view along the line A—A in FIG. 4, and FIG. 6 is a sectional view along the line B—B in FIG. 4.

The gear change device 1 of the illustrated embodiment is constituted by a cylindrical casing 3 for supporting a shift lever that will be described later, a select actuator 4 mounted on the casing 3, and a shift actuator 7. The casing 3 has a select actuator-mounting portion 31 on a side portion (upper side portion in FIG. 4) at one end thereof (right end in FIGS. 4 and 5), and a shift actuator-mounting portion 32 on a lower side portion (lower side portion in FIG. 5) at one end thereof (right end in FIGS. 4 and 5). Further, an opening 33 is formed in the lower part at a central portion of the casing 3.

A control shaft 35 is turnably arranged in the thus constituted casing 3. That is, the control shaft 35 has its one end (right end in FIGS. 4 and 5) turnably supported by a bearing 361 arranged at one end of the casing 3, and has its other end (left end in FIGS. 4 and 5) turnably supported by a bearing 362 arranged at the other end of the casing 3. A shift lever 37 is mounted on the control shaft 35. The shift lever 37 comprises a mounting portion 371 having a hole that fits to the control shaft 35 and a lever portion 372 that is formed to protrude in the radial direction from the mounting portion 371, and the lever portion 372 is arranged to penetrate through an opening 33 formed in the lower portion of the casing 3 as shown in FIG. 5. The mounting portion 371 of the shift lever 37 is provided with an internal spline 371a formed on the inner peripheral surface of the hole so as to be fitted to the control shaft 35, and the internal spline 371a is spline-fitted to an external spline 351 formed on the central portion of the control shaft 35 so as to slide in the axial direction. Thus, the shift lever 37 is supported so as to slide in the axial direction, and the control shaft 35 turnably supported by the casing 31 works as a shift lever support mechanism to support the shift lever 37 arranged in the casing so as to slide in the axial direction and to allow it to turn. In the illustrated embodiment, the control shaft 35 that works as a shift lever support mechanism is arranged nearly horizontally in the casing 3.

As described above, the shift lever 37 is supported by the control shaft 35 as a shift lever support mechanism so as to slide in the axial direction and to turn, and comes properly into engagement, at an end of the lever portion 372, with the shift blocks 301, 302, 303 and 304 that are arranged at a first select position SP1, a second select position SP2, a third select position SP3, and a fourth select position SP4, and that constitute a shift mechanism of the transmission that is not shown. In the illustrated embodiment, the first select position SP1 is set at the reverse gear—first gear select position, the second select position SP2 is set at the second gear— third gear select position, the third select position SP3 is set at the fourth gear—fifth gear select position, and the fourth select position SP4 is set at the sixth gear select position.

Next, described below with reference chiefly to FIG. 4 is the select actuator 4 which actuates the shift lever 37 in the direction of selection which is the axial direction.

The select actuator 4 of the illustrated embodiment comprises an electromagnetic solenoid 40 which works as a source of drive and a select operation mechanism 50 which is operated by the electromagnetic solenoid 40 to actuate the shift lever 37. The electromagnetic solenoid 40 comprises a cylindrical body yoke 41, a front yoke 42 mounted on an end (lower end in FIG. 4) of the body yoke 41, a fixed yoke 43 formed integrally with the front yoke 42, a back yoke 44 provided on the other end (upper end in FIG. 4) of the body yoke 41, an annular electromagnetic coil 45 arranged along the inner peripheral surface of the body yoke 41, an operation rod 46 arranged penetrating through the central portions of the front yoke 42 and the fixed yoke 43 in the axial direction so as to slide, a moving yoke 47 mounted on an upper end of the operation rod 46, and a cover member 48 mounted on the back yoke 44.

The cylindrical body yoke 41 is made of a magnetic material and has a mounting flange 411 at an end thereof (upper end in FIG. 4), the mounting flange 411 being mounted on the select actuator mounting portion 31 by a fixing means 401 such as bolts or the like. The front yoke 42 and the fixed yoke 43 are integrally formed together by using a magnetic material, and the fixed yoke 43 is formed to protrude beyond the upper side surface in the drawing at the central portion of the front yoke 42. An insertion-hole 431 is formed in the front yoke 42 and in the fixed yoke 43 penetrating through the central portions thereof in the axial direction. The thus constituted front yoke 42 and the fixed yoke 43 are such that the fixed yoke 43 is inserted from one end side of the body yoke 41 and the front yoke 42 is mounted on an end of the body yoke 41. The back yoke 44 is formed in an annular shape at the other end of the body yoke 41 (upper end in FIG. 4) integrally therewith.

The electromagnetic coil 45 is wound on an annular bobbin 450 made of a non-magnetic material such as a synthetic resin or the like, and is arranged along the inner periphery of the body yoke 41. The operation rod 46 is made of a non-magnetic material such as a stainless steel or the like, and is inserted in, and fitted to, the insertion-hole 431 formed in the front yoke 42 and in the fixed yoke 43 so as to slide in the axial direction. One end of the operation rod 46 (lower end in FIG. 4) is disposed protruding downward beyond the front yoke 42 mounted on the body yoke 41, and is so constituted as to be able to move forward, or to move backward, in a select operation mechanism accommodation chamber 313 provided by the side of the casing 31. A ball joint 462 is provided at an end of the operation rod 46.

Next, a select operation mechanism 50 will be described.

The select operation mechanism 50 of the illustrated embodiment is accommodated in the select operation mechanism accommodation chamber 313, and has a first lever 51, a second lever 52, a third lever 53 and a fourth lever 54. The first lever 51 is mounted, at its one end, on a support shaft 55 that is arranged in the up-and-down direction (direction perpendicular to the surface of the paper in FIG. 4) and is slidably coupled, at its other end, to the ball joint 462 that is provided at the other end of the operation rod 46 of the electromagnetic solenoid 40. The second lever 52 is mounted, at its one end, on the support shaft 55 and has an engaging pin 56 attached to the other end thereof. The third lever 53 is mounted, at its one end, on a support shaft 57 that is arranged in the up-and-down direction (direction perpendicular to the surface of the paper in FIG. 4) and has an elongated hole 531 formed at the other end thereof. The engaging pin 56 mounted on the other end of the second lever 52 fits into the elongated hole 531. The fourth lever 54 is mounted, at its one end, on the support shaft 57 and has an operation portion 541 formed at the other end thereof. The operation portion 541 formed at the other end is so constituted as to fit to an engaging groove 371b formed in the mounting portion 371 of the shift lever 37 as shown in FIG. 5.

The electromagnetic solenoid 40 constituting the select actuator 4 and the select operation mechanism 50 in the illustrated embodiment are constituted as described above. When an electric current is supplied to the electromagnetic coil 45, the fixed yoke 44 is magnetized, and the moving yoke 47 is attracted by the fixed yoke 43. Therefore, the moving yoke 47 or the operation rod 46 produces a downward thrust in FIG. 4. The magnitude of the thrust produced by the moving yoke 47, i.e., the operation rod 46 is determined by the amount of electric power supplied to the electromagnetic coil 45. When the moving yoke 47, i.e., the operation rod 46 moves downward in FIG. 4 as a result of supplying the electric current to the electromagnetic coil 45, the first lever 51, second lever 52, third lever 53 and fourth lever 54 are respectively operated from the positions shown by solid lines and broken lines to the positions shown by two-dot chain lines in FIG. 4. As a result, the shift lever 37 operated by the operation portion 541 of the fourth lever 54, is operated from the first select position SP1 shown by a solid line in FIG. 5 to the fourth select position SP4.

As shown in FIG. 5, the select actuator 4 of the illustrated embodiment has a select position-limiting mechanism 6 for limiting the position of the shift lever 37 to the first select position SP1, second select position SP2, third select position SP3 or fourth select position SP4 in cooperation with the magnitude of thrust produced by the moving yoke 47, i.e., the operation rod 46 in response to the amount of electric power supplied to the electromagnetic coil 45 of the electromagnetic solenoid 40. The select position-limiting mechanism 6 has, at the central portion of the control shaft 35, a first moving ring 61 and a second moving ring 62 arranged on the right side in FIG. 5 of the mounting portion 371 of the shift lever 37 so as to slide in the axial direction. The first moving ring 61 is limited from moving toward the left in FIG. 5 due to a first stopper 3a formed on the inner peripheral surface of the casing 3. The second moving ring 62 is limited from moving toward the left in FIG. 5 due to a second stopper 3b formed on the inner peripheral surface of the casing 3 on the right side in FIG. 5 maintaining a predetermined distance from the first stopper 3a, and is limited from moving toward the right in FIG. 5 due to a third stopper 3c formed on the inner peripheral surface of the casing 3 on the right side of the second stopper 3b in FIG. 5. Therefore, the second moving ring 62 is constituted to be allowed to move between the second stopper 3b and the third stopper 3c. Here, the first moving ring 61 has a diameter smaller than the inner diameter of the second stopper 3b, and is allowed to operate toward the right in FIG. 5 beyond the second stopper 3b.

A first compression coil spring 63 is arranged between the first moving ring 61 and the mounting portion 371 of the shift lever 37, and a second compression coil spring 64 is arranged between the first moving ring 61 and the second moving ring 62. Further, a third compression coil spring 65 is arranged between the second moving ring 62 and the third stopper 3c. The spring force of the second compression coil spring 64 is set to be larger than the spring force of the first compression coil spring 63, and the spring force of the third compression coil spring 65 is set to be larger than the spring force of the second compression coil spring 64. Therefore, the first moving ring 61 is brought into contact with the first stopper 3a, and the second moving ring 62 is brought into contact with the second stopper 3b.

The select actuator 4 of the illustrated embodiment is constituted as described above. Described below is the operation thereof.

The moving yoke 47, operation rod 46 and select operation mechanism 50 that constitute the electromagnetic solenoid 40 are positioned in states shown by solid lines in FIG. 4 when no electric power is supplied to the electromagnetic coil 45 that constitutes the electromagnetic solenoid 40 of the select actuator 4. And, the first moving ring 61 and the second moving ring 62 constituting the select position-limiting mechanism 6 are positioned in states shown in FIG. 5, where the spring forces of the first compression coil spring 63, second compression coil spring 64 and third compression coil spring 65 are balanced. As a result, the shift lever 37 is brought to the first operation position (SP1).

As described above, the first operation position (SP1) in this embodiment has been set to the reverse gear—first gear select position. In case the electromagnetic solenoid 40 becomes faulty, therefore, the select actuator 4 brings the shift lever 37 to the reverse gear—first gear select position. If the electromagnetic solenoid 40 becomes out of order, therefore, the transmission can be shifted to the first gear with which the vehicle starts traveling or to the reverse gear, and the vehicle can be driven to a predetermined place such as a repair shop.

Figure 7:
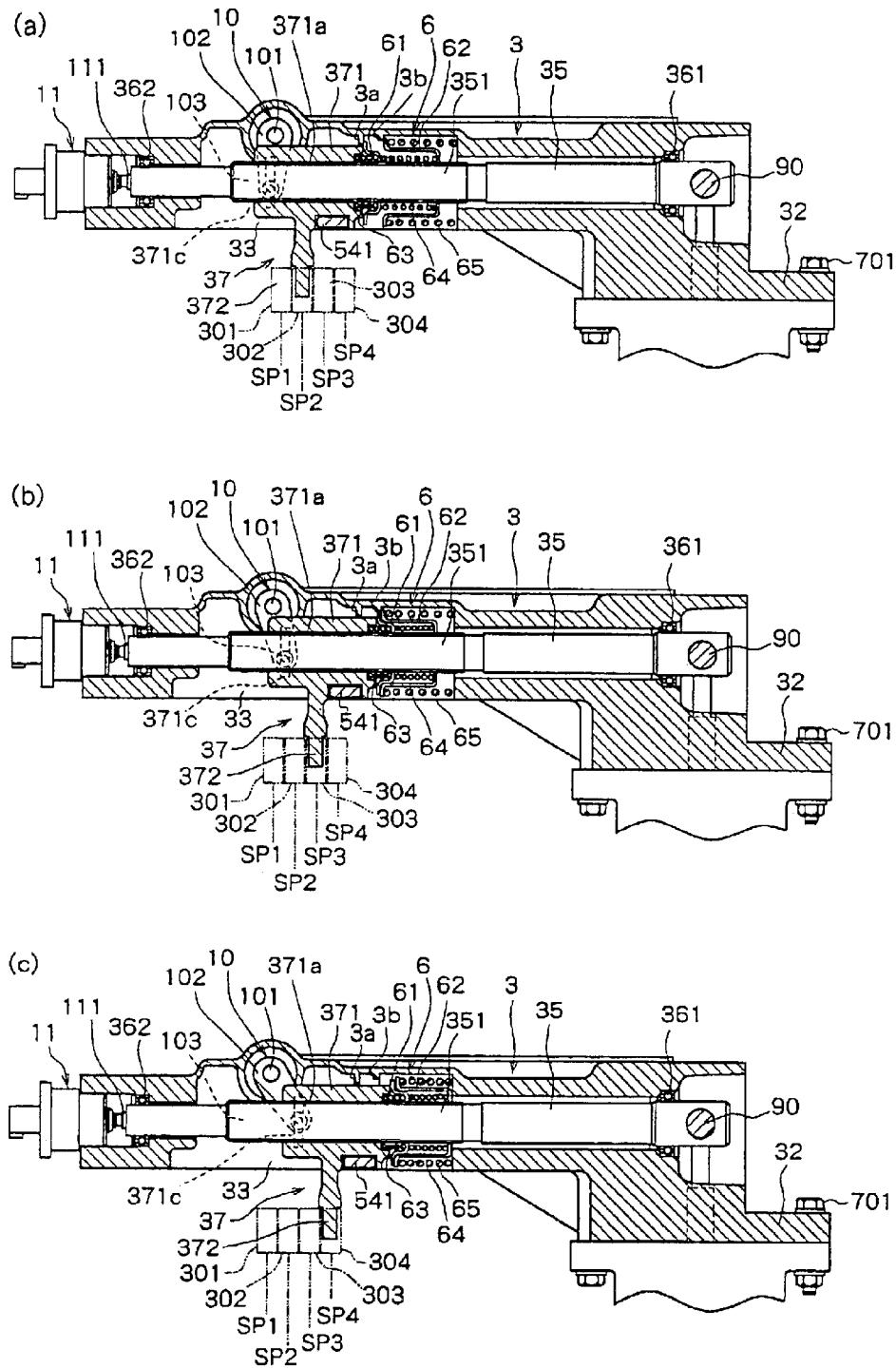
FIG. 7 is a view illustrating an operation of a select actuator that constitutes the gear change device shown in FIG. 4.

When a voltage of, for example, 2 V is applied to the electromagnetic coil 45 that constitutes the electromagnetic solenoid 40 of the select actuator 4 in a state shown in FIGS. 4 and 5, the moving yoke 47 is attracted by the fixed yoke 43, whereby the moving yoke 47 or the operation rod 46 produces a thrust to the downward direction in FIG. 4. As a result, the levers constituting the select operation mechanism 50 are operated in the directions shown by two-dot chain lines from the states shown by solid lines in FIG. 4, and the shift lever 37 is moved toward the right against the spring force of the first compression coil spring 63 as shown in FIG. 7(*a*). And, the shift lever 37 comes to a halt at a position where the right end of the mounting portion 371 has come in contact with the first moving ring 61, and is brought to the second operation position (SP2) as shown in FIG. 7(*a*).

Next, when a voltage of, for example, 4 V is applied to the electromagnetic coil 45 that constitutes the electromagnetic solenoid 40 of the select actuator 4, the moving yoke 47 and the operation rod 46 produces an increased thrust toward the downward direction. As a result, the levers constituting the select operation mechanism 50 are further operated in the directions shown by two-dot chain lines in FIG. 4, and the shift lever 37 is further moved toward the right against the spring forces of the first compression coil spring 63 and of the second compression coil spring 64 in a state of being contacted to the first moving ring 61 as shown in FIG. 7(*b*). The shift lever 37 comes to a halt at a position where the first moving ring 61 is in contact with the second moving ring 62, and is brought to the third operation position (SP3) as shown in FIG. 7(*b*).

Next, when a voltage of, for example, 8 V is applied to the electromagnetic coil 45 that constitutes the electromagnetic solenoid 40 of the select actuator 4, the moving yoke 47 and the operation rod 46 produces a further increased thrust to the downward direction. As a result, the levers constituting the select operation mechanism 50 are operated up to the positions shown by two-dot chain lines in FIG. 4, and the shift lever 37 is further moved toward the right against the spring forces of the first compression coil spring 63, the second compression coil spring 64 and the third compression coil spring 65 in a state where the first moving ring 51 is in contact with the second moving ring 62 as shown in FIG. 7(*c*). Then, the shift lever 37 comes to a halt at a position where the second moving ring 62 is in contact with the third stopper 3*c*, and is brought to the fourth operation position (SP4) as shown in FIG. 7(*c*).

In the select actuator 4 that constitutes the gear change device 1 as described above, the shift lever 37 is supported in the casing 3 so as to slide in the axial direction and to turn, and is operated by the electromagnetic solenoid 40. Therefore, because of employing no rotational mechanism, the select actuator 4 has improved durability. Because of no necessity of employing the reduction mechanism constituted by a ball-screw mechanism or a gear mechanism, which is employed by the actuator using the electric motor, further, the select actuator 4 of the illustrated embodiment can be constituted in a compact size and operates at an increased speed. Further, the select actuator 4 of the illustrated embodiment is equipped with the select position-limiting mechanism 6 and is so constituted as to bring the shift lever 37 to a plurality of select positions depending upon the thrust produced by the operation rod 45 in response to the amount of electric power supplied to the electromagnetic coil 42. Accordingly, a plurality of positions can be selected by using a single electromagnetic solenoid and hence, the select actuator is realized in a compact size and inexpensively.

Next, the shift actuator 7 will be described with reference chiefly to FIG. 6.

The illustrated shift actuator 7 actuates the operation lever 90 mounted on the control shaft 35 in the direction of shift. The operation lever 90 has a pin hole 91 formed in an intermediate portion thereof, and is provided with coupling portions 92 and 93 at both ends thereof. The thus formed operation lever 90 is inserted in a hole 352 formed in an end portion of the control shaft 35 at right angles with the axis thereof, and is mounted on the control shaft 35 by inserting a pin 94 in a pin hole 353 formed in the control shaft 35 and in the pin hole 91. The operation lever 90 works as an operation member that is coupled to the shift lever 37 via the control shaft 35.

The illustrated shift actuator 7 has a first electromagnetic solenoid 2*a* and a second electromagnetic solenoid 2*b* for operating the operation lever 90 in the directions opposite to each other. The first electromagnetic solenoid 2*a* and the second electromagnetic solenoid 2*b* are constituted in substantially the same manner as the electromagnetic solenoid 2 illustrated in FIG. 1 and, hence, the same members are denoted by the same reference numerals but their detailed description is not repeated. The first electromagnetic solenoid 2*a* and the second electromagnetic solenoid 2*b* are arranged in parallel with each other below the control shaft 35 so as to operate in the upward and downward directions, and are mounted on the shift actuator mounting portion 32 provided at one end portion of the casing 3 by a fixing means 201 such as bolts and nuts.

A ball joint 750 is provided at one end (upper end in FIG. 6) of an operation rod 25 that constitutes the first electromagnetic solenoid 2*a*. The coupling portion 92 formed at one end (right end in FIG. 6) of the operation lever 90 is slidably coupled to the ball joint 750. Further, a ball joint 850 is provided at one end portion (upper end in FIG. 6) of an operation rod 25 that constitutes the second electromagnetic solenoid 2*b*. The coupling portion 93 at the other end (left end in FIG. 6) of the operation lever 90 is slidably coupled to the ball joint 850.

The gear change device 1 of the illustrated embodiment has a select position sensor 10 for detecting the position of the shift lever 37 in the axial direction, i.e., for detecting the position of the shift lever 37 in the direction of selection. The select position sensor 10 comprises a potentiometer, and has an end of a lever 102 attached to a turning 101 thereof. An engaging pin 103 attached to the other end of the lever 102 is brought into engagement with an engaging groove 371*c* formed in the side surface of the mounting portion 371 of the shift lever 37. Therefore, when the shift lever 37 moves toward the right or left in FIG. 5, the lever 102 swings on the turning 101. Namely, the turning 101 turns to detect the operation position of the shift lever 37 in the axial direction, i.e., the position of the shift lever 37 in the direction of selection.

Further, the gear change device 1 of the illustrated embodiment has a shift stroke position sensor 11 for detecting the turn position of the shift lever 37, i.e., for detecting the shift stroke position of the shift lever 37. The shift stroke position sensor 11 is mounted on the other end (left end in FIG. 5) of the casing 31. The shift stroke position sensor 11 comprises a potentiometer and its turning 111 is coupled to the other end of the control shaft 35 that is spline-fitted to the shift lever 37. As the shift lever 37 turns, therefore, the control shaft 35 turns, and the turn position, i.e., the shift stroke position of the shift lever 37 is detected. The shift stroke position sensor 11 is not necessarily required for controlling the operation of the shift actuator 7 that is illustrated, but is mounted for confirming the neutral position and the completion of the shifting operation. Therefore, the shift stroke position sensor 11 may be replaced by a position switch for detecting the neutral position and the completion of the shifting operation.

In the gear change device 1 of the illustrated embodiment as described above, the electromagnetic solenoid 40 constituting the select actuator 4, and the first electromagnetic solenoid 2a and the second electromagnetic solenoid 2b constituting the shift actuator 7, are arranged on the one end side of the casing that constitutes the select actuator 3, and the shift stroke position sensor 11 that detects the turn amount of the shift lever 37, i.e., the control shaft 35 is arranged on the other end side of the casing. Therefore, the shift stroke position sensor 11 is not affected by the magnetic field generated by the electromagnetic solenoids. In the illustrated embodiment, further, the select position sensor 10, too, is arranged at the central portion of the casing, and is not affected by the magnetic field generated by the electromagnetic solenoids arranged on the one end side of the casing.

The shift actuator 7 of the illustrated embodiment is constituted as described above. Described below is the operation thereof.

Figure 8:
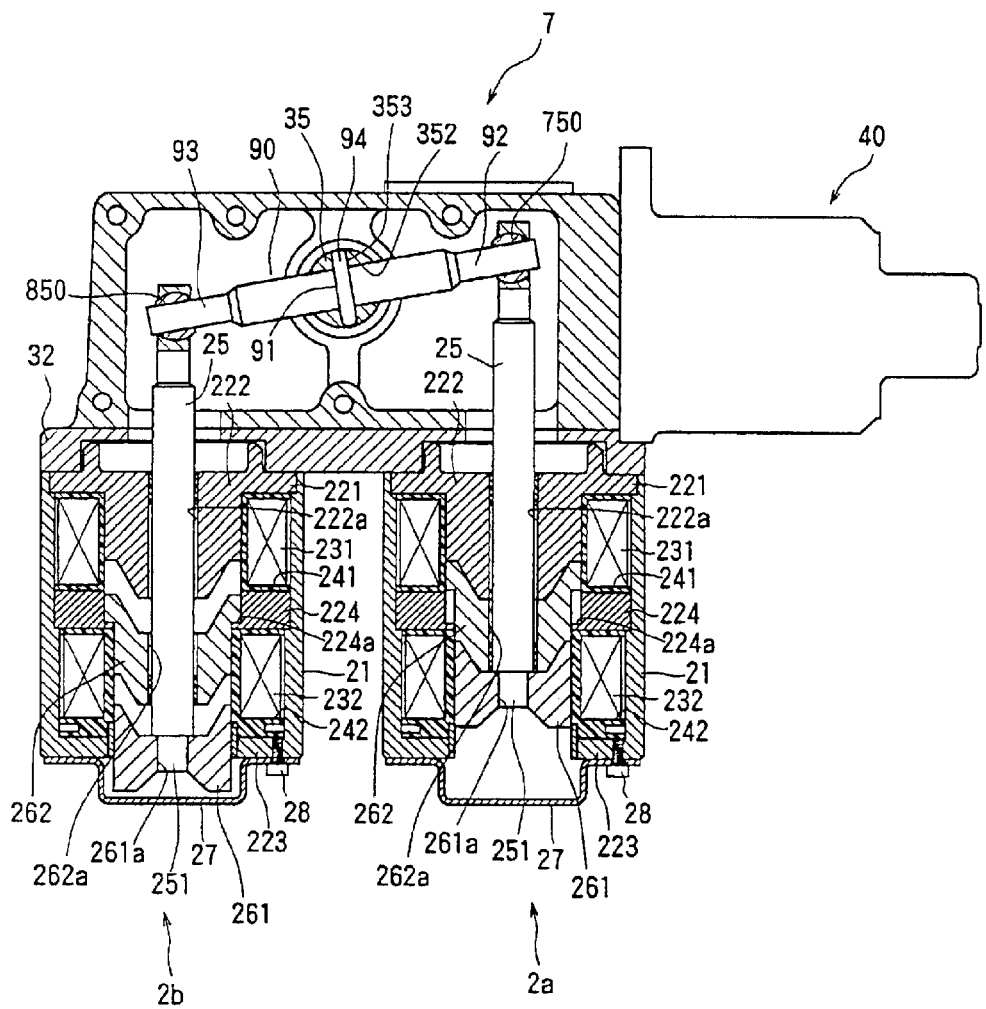
FIG. 8 is a view illustrating an operation of a shift actuator that constitutes the gear change device shown in FIG. 4.

In a state shown in FIG. 6, the gear-changing mechanism is in the neutral condition and the shift lever 37 is at the neutral position. In this state, the first electromagnetic solenoid 2a and the second electromagnetic solenoid 2b are both at such positions that the first moving yoke 261 is in contact with the second moving yoke 262. When an electric current is supplied to the first electromagnetic coil 231 of the first electromagnetic solenoid 2a in the state shown in FIG. 6, a magnetic field generates around the first electromagnetic coil 231 of the first electromagnetic solenoid 2a, and the first moving yoke 261 and the second moving yoke 262 are attracted by the fixed yoke 222 as shown in FIG. 8. Therefore, the operation rod 25 mounting the second moving yoke 262 moves upward as shown in FIG. 8, and the operation lever 90 coupled at its coupling portion 92 to the operation rod 25 turns counterclockwise in FIG. 8 on the control shaft 35 as a center. Thereby, the control shaft 35 mounting the operation lever 90 turns, and the shift lever 37 spline-fitted to the control shaft 35 is shifted in the first direction. Namely, one speed change gear is engaged. When the shifting operation takes place in the first direction as shown in FIG. 8 from the neutral position, the electric current supplied to the first electromagnetic coil 231 of the first electromagnetic solenoid 2a is also supplied to the second electromagnetic coil 232 to maintain a state where the first moving yoke 261 and the second moving yoke 262 are intimately contacted to each other.

Figure 9:
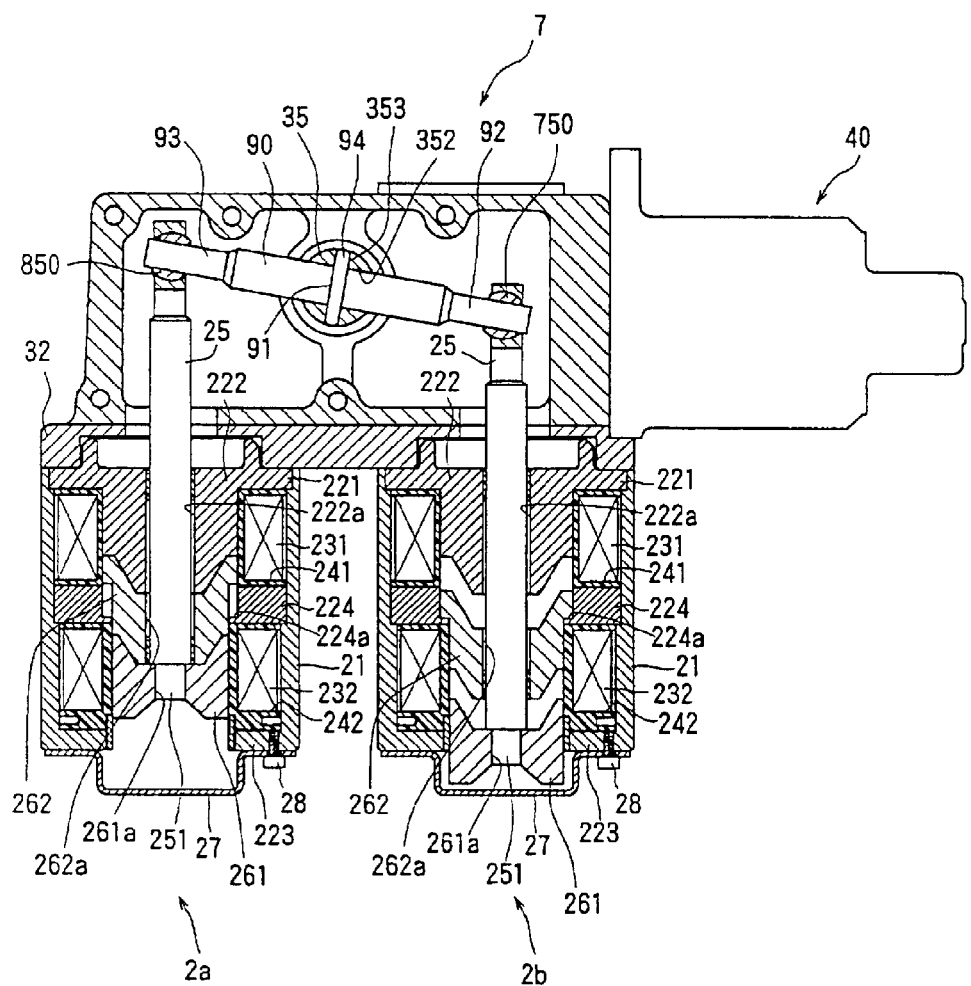
FIG. 9 is a view illustrating an operation of the shift actuator that constitutes the gear change device shown in FIG. 4.

On the other hand, when an electric current is supplied to the first electromagnetic coil 231 of the second electromagnetic solenoid 2b in the state shown in FIG. 6, a magnetic field generates around the first electromagnetic coil 231 of the second electromagnetic solenoid 2b, and the first moving yoke 261 and the second moving yoke 262 are attracted by the fixed yoke 222 as shown in FIG. 9. Therefore, the operation rod 25 mounting the second moving yoke 262 moves upward as shown in FIG. 9, and the operation lever 90 coupled at its coupling portion 93 to the operation rod 25 turns clockwise in FIG. 9 on the control shaft 35 as a center. Thereby, the control shaft 35 mounting the operation lever 90 turns, and the shift lever 37 spline-fitted to the control shaft 35 is shifted in the second direction. Namely, the other speed change gear is engaged. When the shifting operation takes place in the first direction as shown in FIG. 9 from the neutral position, the electric current supplied to the first electromagnetic coil 231 of the second electromagnetic solenoid 2b is also supplied to the second electromagnetic coil 232 to maintain a state where the first moving yoke 261 and the second moving yoke 262 are intimately contacted to each other.

Next, to bring the shift lever 37 to the neutral state, i.e., the neutral position from the state where it has shifted in the first direction shown in FIG. 8, an electric current is supplied to the second electromagnetic coil 232 of the second electromagnetic solenoid 2b. As a result, a magnetic field generates around the second electromagnetic coil 232 of the second electromagnetic solenoid 2b, and the first moving yoke 261 and the second moving yoke 262 are attracted by each other. At this moment, the first moving yoke 261 moves upward and comes to a halt at a position where it is brought into contact with the second moving yoke 262 as shown in FIG. 6, since the second moving yoke 262 is in contact with the stopper portion 224a of the center yoke 224 and is prevented from moving downward in FIG. 8. Accordingly, the operation rod 25 mounting the second moving yoke 262 moves upward to an intermediate position as shown in FIG. 6, and the operation lever 90 coupled at its coupling portion 93 to the operation rod 25 turns clockwise up to the neutral position on the control shaft 35 as a center. Thereby, since the control shaft 35 mounting the operation lever 90 turns up to the neutral position, the shift lever 37 that had been brought to the first shift position is spline-fitted to the control shaft 35 and is operated up to the neutral position. As a result, the neutral condition is established being disengaged from the one speed change gear. At this time, if the electric current is concurrently supplied to the second electromagnetic coil 232 of the first electromagnetic solenoid 2a, the operation force produced by supplying an electric current to the second electromagnetic coil 232 of the second electromagnetic solenoid 2b works mutually together with the operation force produced by supplying an electric current to the second electromagnetic coil 232 of the first electromagnetic solenoid 2a, whereby the influence of parasitic flux is canceled and hence, the shift lever can be brought to a halt at the neutral position more accurately. If specifically described, the operation rod is brought to the intermediate position due to the operation force as a result of supplying the electric current to the second electromagnetic coil 232 of the second electromagnetic solenoid 2b. At this moment, there generates at the same time a parasitic flux denoted by 232b as shown in FIG. 2(a), and the operation rod often moves further upward in FIG. 8 due to the operation force produced by the parasitic flux. Due to the above upward movement of the operation rod beyond the intermediate position, a gap generates between the intermediate yoke 242 of the first electromagnetic solenoid 2a and the first yoke 261. By concurrently supplying the electric current to the second electromagnetic coil 232 of the first electromagnetic solenoid 2a, an attractive force is produced between the intermediate yoke 262 and the first yoke 261 to eliminate the gap. Accordingly, the influence by the parasitic flux is offset by the attractive force and consequently, the operation rod can be brought to a halt at the neutral position more accurately.

On the other hand, to bring the shift lever 37 to the neutral state, i.e., the neutral position from the state where it has shifted in the second direction shown in FIG. 9, an electric current is supplied to the second electromagnetic coil 232 of the first electromagnetic solenoid 2a. As a result, a magnetic field generates around the second electromagnetic coil 232 of the first electromagnetic solenoid 2a, and the first moving yoke 261 and the second moving yoke 262 are attracted by each other. At this moment, the first moving yoke 261 moves upward and comes to a halt at a position where it is brought into contact with the second moving yoke 262 as shown in FIG. 6, since the second moving yoke 262 is in contact with the stopper portion 224a of the center yoke 224 and is prevented from moving downward in FIG. 9. Accordingly, the operation rod 25 mounting the second moving yoke 262 moves upward to an intermediate position as shown in FIG. 6, and the operation lever 90 coupled at its coupling portion 93 to the operation rod 25 turns clockwise up to the neutral position on the control shaft 35 as a center. Thereby, since the control shaft 35 mounting the operation lever 90 turns up to the neutral position, the shift lever 37 that had been brought to the first shift position is spline-fitted to the control shaft 35 and is operated up to the neutral position. As a result, the neutral condition is established being disengaged from the other speed change gear. At this moment, if the electric current is supplied to the second electromagnetic coil 232 of the second electromagnetic solenoid 2b at the same time, the operation force produced by supplying an electric current to the second electromagnetic coil 232 of the first electromagnetic solenoid 2a works mutually together with the operation force produced by supplying an electric current to the second electromagnetic coil 232 of the second electromagnetic solenoid 2b, whereby the influence of parasitic flux is canceled and hence, the shift lever can be brought to a halt at the neutral position more accurately.

As described above, in the shift actuator 7 of the illustrated embodiment, the shift lever can be brought to a halt at the neutral position of the gear-changing mechanism by supplying an electric current to the second electromagnetic coils 232 of the first electromagnetic solenoid 2a and of the second electromagnetic solenoid 2b that constitute the shift actuator 7 without using a position detector means or a complex control device. Further, the shift actuator 7 of the illustrated embodiment comprises the first electromagnetic solenoid 2a and the second electromagnetic solenoid 2b that are arranged in parallel to each other below the control shaft 35 mounting the shift lever 37 so as to move to the upward and downward directions and the operation lever 90 mounted at its intermediate portion on the control shaft 35, and the operation rod 25 of the first electromagnetic solenoid 2a is coupled to one end of the operation lever 90 and the operation rod 25 of the second electromagnetic solenoid 2b is coupled to the other end of the operation lever 90. Therefore, this makes it possible to offset the influences of gravity acting on the operation rod 25 of the first electromagnetic solenoid 2a and on the first moving yoke 261 as well as on the operation rod 25 of the second electromagnetic solenoid 2b and on the first moving yoke 261. Besides, the first electromagnetic solenoid 2a and the second electromagnetic solenoid 2b are arranged to work to the upward and downward directions. Therefore, they are little subject to be affected by the acceleration or deceleration of the vehicle, and the first moving yoke 261 and the second moving yoke 262 can have a very small slide resistance.

Though the present invention has been described above by way of the illustrated embodiments, it should be noted that the invention is in no way limited to the above embodiments only. For example, the embodiments have dealt with the cases where the invention was applied to the select actuator as well as to the shift actuator that constitutes the gear change device. However, the shift actuator according to the present invention can also be applied to a shift assisting device that assists the operation force in the direction of shift in, for example, a manual transmission.

The electromagnetic solenoid according to the present invention is constituted as described above. By supplying an electric current to the second electromagnetic coil, therefore, the operation rod can be brought to a halt at the intermediate operation position without using a position detector means or a complex control device. By supplying the electric current to the first electromagnetic coil and to the second electromagnetic coil, further, the operation rod can be actuated up to the full-stroke position.

Further, the shift actuator for the transmission according to the present invention is constituted as described above. By supplying the electric current to the second electromagnetic coil of the first electromagnetic solenoid or of the second electromagnetic solenoid, therefore, the gear-changing mechanism can be brought to a halt at the neutral position without using a position detector means or a complex control device. Further, the gear-changing mechanism can be operated up to the shift position by supplying the electric current to the first electromagnetic coil, or to the first electromagnetic coil and to the second electromagnetic coil.

What is claimed is:

1. A shift actuator of a transmission equipped with a first electromagnetic solenoid and a second electromagnetic solenoid for actuating, in the directions opposite to each other, an operation member coupled to a shift lever for operating a gear-changing mechanism of the transmission, wherein said first electromagnetic solenoid and said second electromagnetic solenoid comprise, respectively, a cylindrical body yoke, a front yoke arranged on one end side of said body yoke, a fixed yoke that is formed integrally with said front yoke and arranged in said body yoke, a back yoke arranged on the other end side of said body yoke, an annular center yoke arranged at the central portion of said body yoke in the axial direction thereof, a first annular electromagnetic coil that is arranged along the inner peripheral surface of said body yoke between said center yoke and said front yoke so as to surround said fixed yoke, a second annular electromagnetic coil arranged along the inner peripheral surface of said body yoke between said center yoke and said back yoke, an operation rod that is arranged being inserted through said front yoke and said fixed yoke so as to move in the axial direction and is coupled to said operation member, a first moving yoke mounted on an end of said operation rod on the side of said back yoke, a second moving yoke arranged on said operation rod so as to slide between said first moving yoke and said fixed yoke, and limiting means for limiting said second moving yoke from moving toward said back yoke at an intermediate position in a range in which said first moving yoke moves.

* * * * *